(12) United States Patent
Pyzik et al.

(10) Patent No.: US 9,090,510 B2
(45) Date of Patent: Jul. 28, 2015

(54) MULLITE BODY AND METHOD OF FORMING THE MULLITE BODY

(75) Inventors: Aleksander J. Pyzik, Midland, MI (US); Nicholas M. Shinkel, Bay City, MI (US)

(73) Assignee: Dow Global Technologies LLC, Midland, MI (US)

( * ) Notice: Subject to any disclaimer, the term of this patent is extended or adjusted under 35 U.S.C. 154(b) by 100 days.

(21) Appl. No.: 14/125,366

(22) PCT Filed: Apr. 9, 2012

(86) PCT No.: PCT/US2012/032732
§ 371 (c)(1),
(2), (4) Date: Dec. 11, 2013

(87) PCT Pub. No.: WO2012/154357
PCT Pub. Date: Nov. 15, 2012

(65) Prior Publication Data
US 2014/0302978 A1    Oct. 9, 2014

Related U.S. Application Data

(60) Provisional application No. 61/485,345, filed on May 12, 2011.

(51) Int. Cl.
*C04B 35/185* (2006.01)
*B01J 21/16* (2006.01)
(Continued)

(52) U.S. Cl.
CPC ............ *C04B 35/185* (2013.01); *B01J 21/16* (2013.01); *B01J 23/40* (2013.01); *B01J 37/0215* (2013.01); *C04B 38/0006* (2013.01);
(Continued)

(58) Field of Classification Search
CPC .............................. C04B 35/18; C04B 35/185
USPC .................................................. 501/127, 128
See application file for complete search history.

(56) References Cited

U.S. PATENT DOCUMENTS 3,881,944 A * 5/1975 Beall et al. .......................... 501/7
4,418,024 A * 11/1983 Prochazka et al. ........... 264/1.21
(Continued)

FOREIGN PATENT DOCUMENTS

CN      101781124 A     7/2010
WO    2009158294 A1    12/2009
(Continued)

OTHER PUBLICATIONS

Xie, C., et al., Method for preparing porzite porous honeycomb ceramic with needle-shaped crystal structure, CN101781124A, Jul. 21, 2010, Jingdezhen Ceramic Insti.
(Continued)

*Primary Examiner* — Noah Wiese

(57) ABSTRACT

A mullite body comprising: a plurality of crystals, wherein about 70 percent or greater of the crystals have a crystal diameter that is within about 3 microns or less of an average diameter of the plurality of crystals, and a porosity of 55 percent or greater; and made using a process comprising: mixing precursor materials together with an average aggregate particle size of about 3 microns or smaller measured using a particle size analyzer; heating greenware in air to a first temperature such that the greenware is dried and forms calcineware, heating the calcineware in a silicon tetrafiouride atmosphere to form flurotopaz, and heating to a second temperature so that a mullite structure is formed.

18 Claims, 4 Drawing Sheets

(51) Int. Cl.
   *B01J 23/40*     (2006.01)
   *B01J 37/02*     (2006.01)
   *C04B 38/00*     (2006.01)
   *C04B 111/00*    (2006.01)
   *C04B 111/20*    (2006.01)
   *C04B 111/34*    (2006.01)

(52) U.S. Cl.
   CPC ............ *C04B 2111/0081* (2013.01); *C04B 2111/00793* (2013.01); *C04B 2111/2084* (2013.01); *C04B 2111/343* (2013.01); *C04B 2235/3217* (2013.01); *C04B 2235/349* (2013.01); *C04B 2235/3445* (2013.01); *C04B 2235/5436* (2013.01); *C04B 2235/6584* (2013.01); *C04B 2235/661* (2013.01); *C04B 2235/784* (2013.01); *C04B 2235/786* (2013.01)

(56) References Cited

U.S. PATENT DOCUMENTS

| | | | |
|---|---|---|---|
| 4,418,025 A * | 11/1983 | Prochazka et al. | 264/1.21 |
| 4,640,904 A * | 2/1987 | Hillig et al. | 501/128 |
| 4,826,789 A * | 5/1989 | Jones et al. | 501/80 |
| 4,910,172 A | 3/1990 | Talmy et al. | |
| 4,911,902 A | 3/1990 | Talmy et al. | |
| 4,937,209 A * | 6/1990 | Jones et al. | 501/80 |
| 4,937,210 A * | 6/1990 | Jones et al. | 501/80 |
| 4,948,766 A | 8/1990 | Talmy et al. | |
| 4,963,436 A * | 10/1990 | Jones et al. | 428/403 |
| 4,978,640 A * | 12/1990 | Kelly | 501/32 |
| 5,098,455 A * | 3/1992 | Doty et al. | 55/523 |
| 5,109,051 A * | 4/1992 | Kroenke et al. | 524/444 |
| 5,173,349 A | 12/1992 | Yavuz et al. | |
| 5,194,154 A | 3/1993 | Moyer et al. | |
| 5,198,007 A | 3/1993 | Moyer et al. | |
| 5,252,272 A | 10/1993 | Yavuz et al. | |
| 7,425,279 B2 | 9/2008 | Cote et al. | |
| 7,425,297 B2 | 9/2008 | Saha et al. | |
| 7,485,594 B2 | 2/2009 | Saha et al. | |
| 8,449,643 B2 * | 5/2013 | Suzuki et al. | 55/523 |
| 2007/0213207 A1 | 9/2007 | Saha et al. | |
| 2010/0242458 A1 * | 9/2010 | Suzuki et al. | 60/311 |
| 2012/0317945 A1 * | 12/2012 | Miyairi | 55/523 |

FOREIGN PATENT DOCUMENTS

| | | |
|---|---|---|
| WO | 2010033763 A1 | 3/2010 |
| WO | 2011008463 A1 | 1/2011 |

OTHER PUBLICATIONS

Pyzik, et al., "Formation mechanism and microstructure development in acicular mullite ceramics fabricated by controlled decomposition of fluorotopaz", Journal of the European Ceramic Society, 28, 2008, 383-391, May 3, 2007, Elsevier Ltd.

Reed, J., et al., Introduction to the Principles of Ceramic Processing, Wiley Interscience, 1988, Chapters 20 and 21.

\* cited by examiner

MULLITE BODY AND METHOD OF FORMING THE MULLITE BODY

CLAIM OF PRIORITY

This application claims the benefit of U.S. Provisional Patent Application Ser. No. 61/485,345, filed May 12, 2011, the contents of which are incorporated by reference herein.

FIELD OF THE INVENTION

The present invention generally relates to an acicular mullite body with an improved ability to withstand a thermal shock, and more specifically a process for creating an acicular mullite body with an improved microstructure that increases material strength at a given porosity and improves resistance to thermal stresses.

BACKGROUND OF THE INVENTION

Currently, to meet regulatory standards particulate filters are used in conjunction with exhaust systems for engines and particularly exhaust systems for diesel engines to remove contaminants from the exhaust stream. Requirements have been placed on the particulate filters to meet multiple contradictory exacting requirements. For example, the filter is expected to have a sufficient porosity (e.g., generally greater than 55 percent porosity) while still retaining most of the emitted micrometer sized diesel particulates (e.g., generally greater than 90 percent capture of the emitted particulates). The filter is expected to be permeable enough so that excessive back pressure does not occur too quickly, and it is expected that the particulate filter may be loaded with a great amount of soot before being regenerated. The filter is expected to withstand the corrosive exhaust environment for long periods of time. The filter is expected to withstand thermal cycling (i.e., withstand cracking, melting, deactivation, reduced filtration efficiency, or a combination thereof) from the burning off of the soot entrapped in the filter (i.e., regeneration) over thousands of cycles where local temperatures may reach as high as 1400° C. From these stringent criteria, ceramic filters have been the choice of material to develop a diesel particulate filter.

These contradictory requirements force ceramists to look for even more improved materials that retain strength properties while maintaining a high porosity and filtering ability without unduly increasing back pressure. Acicular mullite meets many of these needs; however, there are still areas that may be improved such as resistance to thermal shock, high overall strength, increased porosity, resistance to backpressure build up, or a combination thereof.

U.S. Pat. Nos. 7,485,594 and 7,425,297 disclose various calcination and mullitization temperatures and durations used for making acicular mullite all of which are incorporated by reference herein. Pyzik et al., "Formation mechanism and microstructure development in acicular mullite ceramics fabricated by controlled decomposition of fluorotopaz, available at www.science direct.com, or Journal of the European Ceramic Society 28 (2008) 383-391, May 3, 2007, discloses a method of forming acicular mullite ceramics, incorporated by reference herein. Accordingly, it would be desirable to provide a ceramic material that has a high strength and high resistance to thermal shock, while maintaining a high porosity so that back pressure does not quickly increase.

SUMMARY OF THE INVENTION

The present invention seeks to solve one or more of these problems by providing a diesel particulate filter with an improved microstructure that has a high porosity with a high strength and resistance to a thermal shock. The present invention further solves one or more these problems by providing an acicular mullite diesel particulate filter that has a more uniform microstructure with an even distribution of acicular mullite grains.

A first aspect of the invention is a mullite body comprising: a plurality of crystals, wherein about 70 percent or greater of the crystals have a crystal diameter that is within about 3 microns or less of an average diameter of the plurality of crystals, and a porosity of 55 percent or greater.

Until the present invention reducing the size of precursor materials has generally been discouraged due to the negative effects upon porosity, for example, smaller beginning precursor materials create smaller grains, smaller pores, and lower overall porosity. Surprisingly, it has been discovered that by highly attriting precursor materials an acicular mullite body with an improved microstructure results with a high final strength and an increased resistance to a thermal shock, while still maintaining a high porosity, larger pore size, and a uniform grain size.

A second aspect of the present invention is a process comprising: mixing precursor materials together with an average aggregate particle size of about 3 microns or smaller, measured using a particle size analyzer; heating greenware in air to a first temperature such that the greenware is dried and forms calcineware, heating the calcineware in a silicon tetraflouride atmosphere to form fluorotopaz, and heating to a second temperature so that a mullite structure is formed.

Surprisingly, the present method allows for the formation of an acicular mullite body that has a uniform microstructure with an increased strength and thermal shock so that the acicular mullite body retains that strength sufficiently to survive the thermal cycling experienced over the life of a vehicle. The method of the present invention allows for creation of an acicular mullite body with a high connectivity such that the acicular mullite body has an improved final strength that allows increased temperatures during a thermal shock without damage to the acicular mullite body. The improvements in strength can be achieved without a reduction in porosity and/or average pore size of the acicular mullite body.

DETAILED DESCRIPTION OF THE INVENTION

Figure 1:
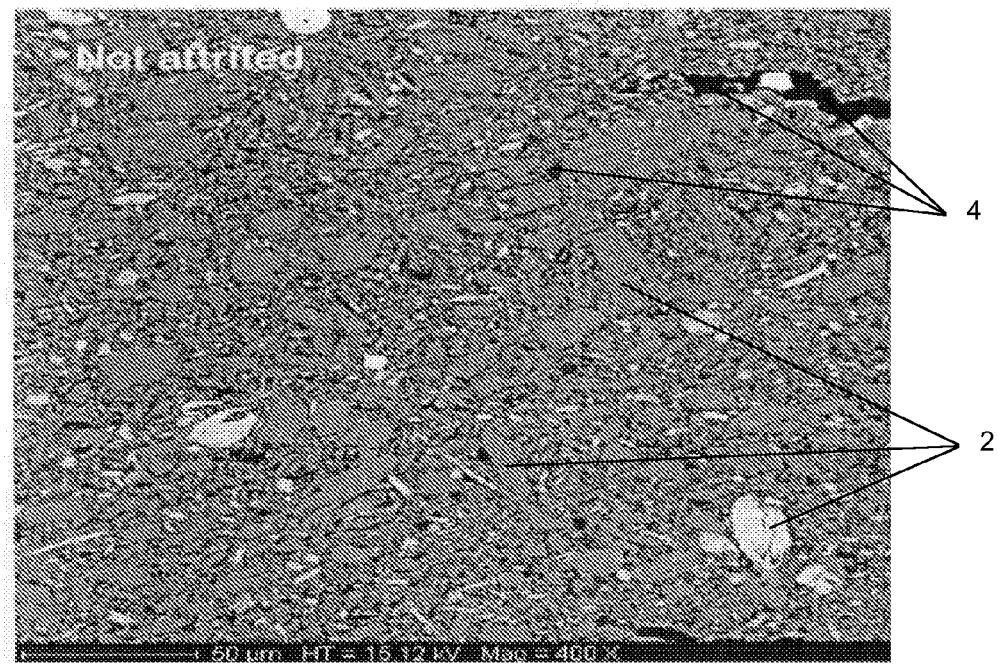
FIG. 1 illustrates one example of a calcined greenware body using standard precursors.

The following description of the preferred embodiment(s) is merely exemplary in nature and is in no way intended to limit the invention, its application, or uses.

The mullite composition is comprised of acicular mullite grains (i.e., acicular mullite crystals) essentially chemically bound to one another. It is desirable that the mullite composition contains a sufficient amount of grains to filter particulate materials from the exhaust as well as resist damage during regeneration cycles. The mullite grains may comprise about 80 percent or more, about 85 percent or more, or even about 90 percent or more by volume of the mullite composition. The mullite grains comprise about 99 percent or less, about 98 percent or less, or about 97 percent or less by volume of the composition. The mullite composition, in addition to the mullite grains, almost invariably contains a glassy phase comprised of silica, alumina, and metal in the form of oxides. The glassy phase, generally, is situated at the mullite grain surfaces and at intersecting grain surfaces.

Acicular mullite grains are grains that have an aspect ratio of greater than 2 (e.g., length twice as great as width). Desirably, the acicular mullite grains present in the mullite composition have an average aspect ratio of at least 5. The average aspect ratio may be about 2 or more, about 5 or more, about 10 or more, about 15 or more, or even about 20 or more. The average aspect ratio may be about 50 or less, about 40 or less, or about 35 or less.

The diameter (e.g., the spherical cross-sectional length) of the grains (e.g., needles, fibers, crystals, or a combination thereof) may vary though out the acicular mullite body or from mullite body to mullite body. The acicular mullite body may be comprised of only small grains. The acicular mullite body may be comprised of only large grains. The acicular mullite body may be comprised of only medium sized grains. Preferably, the acicular mullite body may include both large grains and medium grains. More preferably, the acicular mullite body may primarily include small grains and medium grains. The grains with a diameter of smaller than about 1 micron may be considered ultra-small grains. The grains with a diameter between about 1 micron and about 10 microns may be considered small grains. The grains with a diameter that range from between about 10 to about 15 microns may be considered medium grains. The grains with a diameter that range from between about 15 microns to about 25 microns are considered large grains. The grains with a diameter that are above 25 microns are considered ultra-large grains. The acicular mullite body may include a distribution of different grain diameters. The distribution of diameters may be any so that the acicular mullite body has high strength, high porosity, and filters particulates without creating a high backpressure. The diameter of the grains may range from between about 1 micron to about 100 microns, preferably the diameter of the grains may range from between about 1 micron to about 50 microns, and more preferably the diameter of the grains may range from between about 2 microns to about 20 microns. Most preferably, about 70 percent or more, about 80 percent or more, preferably about 90 percent or more, or more preferably about 95 percent or more of the grains are between about 2 microns to about 20 microns.

The teachings of the present invention may result in a more consistent distribution of grain sizes. The present invention may narrow the range of grain sizes (i.e. diameters) of an acicular mullite body. The present invention may result in an acicular mullite body that is substantially all small grains. The present invention may result in an acicular mullite body that is substantially all medium grains. The present invention may reduce the variation in grain size of the total population of grains. For example, the standard deviation of the mean grain size may be reduced. The standard deviation of the average grain size may be reduced by about 10 percent or more, about 15 percent or more, or even about 20 percent or more. The standard deviation of the average grain size may be reduced by about 50 percent or less, about 40 percent or less, or about 30 percent or less. The diameter of the grains may fall within a distribution or range. The distribution of grain diameters of about 70 percent or more, about 80 percent or more, preferably about 90 percent or more, or more preferably about 95 percent or more of the grains is within about 3.5 microns or less, about 3.0 microns or less, preferably about 2.7 microns or less, or more preferably about 2.5 microns or less of the average diameter. For example, if the average grain diameter is 7 microns the 90 percent of the grain diameters are within about 3 microns of average then 90 percent of the grains will have a diameter of between 4 microns and 10 microns The teaching of the present invention may greatly reduce the number of ultra-large grains. Preferably, the acicular mullite body may be substantially free of ultra-large grains. More preferably, the acicular mullite body may be free of ultra-large grains. The number of ultra-large grains may be reduced to about 10 percent or below, preferably about 7 percent or below, more preferably about 5 percent or below, even more preferably about 3 percent or below, or most preferably less than about 1 percent of the total population of grains. The number of ultra-large grains may be between about 2 percent to about 0 percent. For example, if there are 100 grains present in a sample, one or less grains may be ultra large.

The teaching of the present invention may greatly reduce the number of ultra-small grains. Preferably, the acicular mullite body may be substantially free of ultra-small grains. The number of ultra-small grains may be reduced to about 10 percent or below, preferably about 7 percent or below, more preferably about 5 percent or below, even more preferably about 3 percent or below, or most preferably less than about 1 percent of the total population of grains. The number of small ultra-grains may be between about 1 percent and about 0 percent. For example, if there are 100 grains present in a sample, one or less grains may be ultra-small grains.

The acicular mullite body may be comprised of primarily small grains. The acicular mullite body may include an adequate amount of small grains so that the mullite body has high strength and thermal shock resistance while maintaining a sufficiently high porosity. The acicular mullite body may have about 70 percent or more small grains, about 75 percent or more small grains, preferably about 80 percent or more small grains, more preferably about 85 percent or more small grains, or most preferably about 87 percent or more small grains. The acicular mullite body may have about 100 percent or less small grains or about 95 percent or less small grains (i.e. about 87.5 percent small grains). The acicular mullite body may have between about 75 percent and about 100 percent small grains and preferably between about 80 percent and 90 percent small grains.

The structure of the present invention, created using the method discussed herein for making the present invention may result in an increase in broken grains during testing. The broken grains may be created when the acicular mullite body is bent and broken during the four point bending test according to ASTM C1161. The grains may be broken due to their connection with other grains and when the bending test is performed the grains fail, thus, resulting in broken grains. The number of broken grains may increase due to the increased connections between grains. The percentage of broken grains may be calculated by taking the number of broken grains and dividing by the number of broken grains plus the number of non-broken grains (i.e., broken grains/total number of grains). The percentage of broken grains may be about 70 percent or greater, preferably about 80 percent or greater, more preferably about 90 percent or greater, or most preferably about 95 percent or greater.

The structure and method of the present invention may result in a reduction and/or the elimination of starbursts in the microstructure of the acicular mullite bodies. The number of starbursts present in the mullite bodies of the present invention may be reduced and/or eliminated so that the microstructure of the acicular mullite body is uniform and the number of ultra-small grains and large grains are reduced, eliminated, or both. The acicular mullite body may be substantially free of starbursts. The acicular mullite body may include about 5 or less, about 4 or less, preferably about 3 or less, more preferably about 2 or less, even more preferably about 1 or less, or most preferably about zero starbursts per every 100 micron$^2$ area of an acicular mullite body. A starburst is a crystalline structure in the acicular mullite body that has a central location with multiple individual crystals stemming from one central location. A starburst may include a center with small grains stemming from the center. The inclusion of starbursts within the microstructure of an acicular mullite body may provide a non-uniform microstructure and weaken the mullite bodies. The inclusion of starbursts may lower connectivity between grains, increase the number of ultra-small gains present in the mullite body, reduce the number of broken grains, or a combination thereof.

The microstructure of the acicular mullite body may be determined by suitable techniques such as microscopy on a polished section. For example, the average mullite grain size may be determined from a scanning electron micrograph (SEM) of a polished section of the body, wherein the average grain size may be determined by the intercept method described by Underwood in *Quantitative Stereology*, Addison Wesley, Reading, Mass., (1970), incorporated by reference herein for all purposes. The grain diameter may be measured using a computer assisted measurement as described herein, which includes between about 550 to 600 grains per sample.

The mullite body may have a strength. The strength of the mullite body is preferably such that the mullite body has a sufficiently high porosity to remove particulates and is not damaged during vibration and repeated thermal cycling. The strength of the body may be measured at any point in the production of the mullite body. For example, the strength may be measured after a step of calcination, a step of mullitization, or a final heat treatment. Preferably, when referring to strength herein the strength is after the mullite body has been heat treated.

The acicular mullite body (i.e., composition), when used as a diesel particulate trap should have a strength that is adequate to survive a diesel particulate trap environment. Generally, the strength may be about 20 MPa or greater. Preferably, the strength may be about 25 MPa or greater. More preferably, the strength may be about 30 MPa or greater. Even more preferably the strength may be about 35 MPa or greater. Most preferably, the strength may be about 40 MPa or greater. The strength may be about 60 MPa or less, preferably about 55 MPa or less, or more preferably about 50 MPa or less (i.e. between about 36 MPa and about 46 MPa or preferably between about 44 MPa and about 50 MPa). The strength is generally determined by 4 point bending of a bar cut from an extruded honeycomb that was subsequently mullitized. The strength measurement may be made using a known technique such as described by ASTM C1161. The strength and porosity of the mullite body are inversely proportional. For example, as the porosity of the body increases the strength of the mullite body goes down. The strength of the mullite bodies as discussed herein have a porosity of about 55 percent or greater.

Strength may be influenced by one or more factors. One factor that affects strength is connectivity. Connectivity is defined as the number of grains that contact one or more other grains at a location other than the base of each grain, divided by the total population of grains in a sample. For example, a mullite body that has 100 total grains and a connectivity of 99 percent would have one grain that is not touching at least one other grain other than at the base of the grain where the grain is attached to the mullite structure. Connectivity may be measured by counting the number of grains that are in contact with other grains at a location other than the base. Connectivity may be measured by counting the number of grains that are not contacting another grain at an area other than its base. Another method to measure connectivity may be to count the number of broken grains (i.e. connected grains) is a given population after a four point bending test has been performed. Connectivity is calculated based upon a population of connected grains in a given area, and this calculation is independent of the volume of the mullite grains that are chemically bound to other mullite grains. For example, one exceptionally large grain may vary a calculation based on volume of the mullite grains; whereas, the connectivity calculation is performed independent of volume so one exceptionally large grain will not drastically vary the connectivity calculation. The mullite bodies have a connectivity which results in the desired strength. The mullite bodies of the present invention may have a connectivity of about 75 percent or greater, preferably about 90 percent or greater, more preferably about 95 percent or greater, even more preferably about 97 percent greater, or most preferably about 99 percent or greater. The mullite bodies may have a connectivity of between about 75 percent and about 99 percent, preferably between about 85 percent and about 99 percent, more preferably between about 90 percent and about 100 percent, or most preferably between about 95 percent and about 100 percent. Connectivity and the number of grains broken during a four point bending test may be directly related. For example, a part with 99 percent connectivity will result in 99 percent of the grains located along the break plane, breaking during a four point bending test.

The acicular mullite body should be sufficiently porous (for example, at least about 55 percent porous) to be useful as a diesel particulate filter, as previously described. However, the porosity may not be so great that the strength, is so low that the filter breaks or fails to capture sufficient particulate matter. The porosity of the acicular mullite body may be about 60 percent or more, preferably about 65 percent or more, or more preferably about 70 percent or more. The porosity of the acicular mullite body may be about 90 percent or less, preferably about 85 percent or less, or more preferably about 80 percent or less. The porosity may be between about 60 percent and about 90 percent, preferably between about 65 percent and about 85 percent, and most preferably between about 65 and about 75 percent.

In addition, the mullite composition desirably has a permeability coefficient that is as high as possible to reduce back pressure buildup, while still retaining sufficient particles. The permeability coefficient is proportional, for example, to the total amount of porosity and size of the pores and inversely proportional to tortuousity of the interconnected porosity. Generally, the permeability coefficient should be at least $1 \times 10^{-13} m^2$ as determined using Darcey's equation. Preferably, the permeability coefficient is at least $2 \times 10^{-13} m^2$.

The acicular mullite body will include an average pore size. The average pore size may be any pore size that allows the desired porosity to be achieved. The average pore size and the number of pores may be inversely proportional for a given porosity. For example, the smaller the pore size in the acicular mullite body the more pores the acicular mullite body will include and vice versa. The average pore size may be any pore size that allows for particles to be retained within the acicular mullite body without a large increase in back pressure or a large pressure drop across the acicular mullite body (i.e. the amount of pressure on the inlet side of the acicular mullite body minus the amount of pressure on the outlet side of the acicular mullite body). Pore size is measured using a mercury porosimetry technique. The average pore size of the acicular mullite body may be about 1 micron or larger, preferably about 5 microns or larger, or more preferably about 8 microns or larger. The average pore size of the acicular mullite body may be about 100 microns or less, preferably about 75 microns or less, or more preferably about 60 microns or less. The average pore size may be between about 5 microns to about 50 microns, or about 10 to 25 microns. Preferably, the average pores size may be between about 2 microns to about 40 microns, preferably about 3 microns to about 30 microns, more preferably about 4 microns to about 25 microns, or even more preferably about 6 microns to about 12 microns (e.g. about 9.7 microns).

Even though the theoretical Al/Si mullite stoichiometry is 3 ($3Al_2O_3 2SiO_2$), the bulk Al/Si stoichiometry of the mullite composition may be any suitable stoichiometry, such as 4 Al/Si to 2Al/Si. Bulk stoichiometry means the ratio of Al to Si in the body (that is, not each individual grain). It is preferred that the bulk stoichiometry of the body is less than 3, which correlates to an alumina ($Al_2O_3$) to silica ($SiO_2$) stoichiometry of less than about 1.5. The Al/Si bulk stoichimetry preferably is at most about 2.95, more preferably at most about 2.9, even more preferably at most abut 2.85 and most preferably at most about 2.8 to preferably at least about 2. The bulk stoichiometry may be measured by any suitable techniques, such as those known in the art, including, for example, X-ray fluorescence.

Because it is desirable to use clays (e.g. fresh clay or calcined clay) to facilitate making a plastic mass for extruding honeycombs, the acicular mullite generally has some amount of metal oxides arising, at least in part, from the metal oxides present in the clay or clays used. Typically, the amount of metal oxides (that is, elements other than those present in the mullite formula discussed herein) present in the composition is generally at most about 5 percent by weight of the body. Preferably, the total amount of metal oxides is at most about 4 percent, more preferably at most about 3 percent, even more preferably at most about 2.5 percent, and most preferably at most about 2 percent. The composition may include about 0.5 percent or more, about 1.0 percent or more, or even 1.5 percent or more by weight percent metal oxides. The amount of metal oxides may be determined by any suitable bulk analysis technique, such as those known in the art (for example, X-ray fluorescence).

If the mullite precursors contain metal oxides of magnesium and/or iron, the acicular mullite composition preferably is comprised substantially of acicular mullite grains that are essentially chemically bound, wherein the mullite composition has a glassy phase at the surface of the mullite grains, the glassy phase having iron and magnesium essentially incorporated into the glassy phase. The magnesium and iron are essentially incorporated into the glass phase when, at most, trace amounts of crystalline precipitates of Mg and/or Fe are detected by X-ray diffraction or electron diffraction.

It is also desirable that the mullite composition is substantially free of fluorine. The heat-treatment of this invention also causes the fluorine to be reduced, while accomplishing the incorporation of the Mg and Fe into the glass. Typically, mullitized mullite contains 2 to 3 percent by weight of fluorine. Preferably, the amount of fluorine is at most 0.5 percent, more preferably at most 0.25 percent, even more preferably at most 0.1 percent, and most preferably at most a trace amount by weight in the mullite composition.

It has been discovered that iron and magnesium impurities in precursor materials may form a crystalline precipitate, within the glass phase of an acicular mullite composition, for example, upon thermal cycling experienced in diesel particulate trap applications. These precipitates may be essentially incorporated into the glassy phase by the heat treatment described herein and are not reformed by thermally cycling.

The acicular mullite body may include a dopant. The dopant may be any substance that increases the strength of the acicular mullite body. The dopant may be any substance that increases the porosity of the acicular mullite body. The dopant may be any substance that does not inhibit particle collection in the acicular mullite body. The dopant may be any material that increases the amount of glass material in the acicular mullite body. The dopant may be any material that maintains the amount of glass material in the acicular mullite body, but positively affects distribution of the glass material throughout the acicular mullite body. For example, the dopant may increase the amount of glass material between two or more touching mullite grains. In another example, the amount of glass may not be increased between two or more touching mullite grains but the glass may be distributed over a larger area between the two or more grains.

The amount of dopant added to the acicular mullite body may be any amount that increases the final strength of the composition, increases the amount of particles the composition may hold, increases connectivity, or a combination thereof. The amount of dopant added to the acicular mullite body may be about 0 percent by weight or greater, preferably about 0.5 percent by weight or greater, more preferably about 1.0 percent by weight or greater, even more preferably about 1.5 percent by weight or greater, or most preferably about 2.0 percent by weight or greater. The amount of dopant added may be about 5.0 percent by weight or less, preferably about 4.0 percent by weight or less, more preferably about 3.0 percent by weight or less, even more preferably about 2.5 percent by weight or less, or most preferably about 2.0 percent by weight or less (i.e. between about 1.0 percent by weight to about 2.0 percent by weight). The dopant selected may be any material that helps improve porosity, strength, resistance to a thermal shock, resistance to back pressure build up, or a combination thereof. Preferably, the dopant may be Mg, Ca, Fe, Na, K, Ce, Pr, Nd, Sm, Eu, Gd, Tb, Dy, Ho, Er, Tm, Yb, Lu, B, Y, Sc, La, or mixtures thereof. Typically, dopants may be introduced in the form of oxides. For example, some dopant mixtures may be $MgO/Fe_2O_3$, Cerium Dioxide ($CeO_2$), $Nd_2O_5/MgO$, $Nd_2O_5/CaO$, $B_2O_3/MgO$, $B/CaO$, $CeO_2/MgO$, $CeO_2/Y_2O_3$, $Y_2O_3$, or mixtures thereof. The dopant may have a ratio of components. The ratio of dopant components may be any ratio that strength, resistance to a thermal shock, resistance to back pressure build up, or a combination thereof. For example, if the dopant includes both magnesium and iron the ratio of magnesium to iron may be 1:1. The ratio of components may be between about 5:1 to about 1:5, preferably between about 3:1 and 1:3, more preferably between about 2:1 and about 1:2, even more preferably between about 1.5:1 to about 1:1.5, or most preferably between about 1.2:1 to about 1:1.2 (i.e. about 1:1). Additional uses of dopants (i.e. enhancing compounds) can be gleaned from the teachings herein, including those of U.S. Pat. No. 7,485,594 Column 5, line 31-Column 6, line 34, incorporated by reference herein.

In making the mullite composition, precursor compounds containing Al, Si, and oxygen are mixed to form a mixture capable of forming mullite. Precursor compounds that may be used are described in U.S. Pat. Nos. 5,194,154; 5,198,007; 5,173,349; 4,911,902; 5,252,272; 4,948,766 and 4,910,172. The mixture may contain other compounds, such as fillers (particulates that do not react to form mullite, but are retained within the mullite after it is formed). The mixture may also contain organic compounds to facilitate the shaping of the mixture (for example, binders and dispersants, such as those described in *Introduction to the Principles of Ceramic Processing*, J. Reed, Wiley Interscience, 1988).

The mixture may be comprised of any combination of materials that will result in an acicular mullite body. The mixture may include one or more precursor materials discussed herein in order to create an acicular mullite body. The amount of each precursor materials may vary from mixture to mixture. Generally, the mixture is comprised of clay (that is, hydrated aluminum silicate) and compounds such as, alumina, silica, aluminum trifluoride, fluorotopaz, and zeolites. Preferably, the precursor compounds are selected from the group consisting of clay, silica, alumina and mixtures thereof. Most preferably, the mixture is comprised of clay and alumina.

The mixture may be made by any suitable method such as those known in the art. Examples include ball milling, ribbon blending, vertical screw mixing, V-blending, and attrition milling. The mixture may be prepared dry (that is, in the absence of a liquid medium) or wet.

The particle size of the precursor compounds may be reduced and/or attrited. The size of the particles may be reduced using any method that results in smaller particles. The particle size of the precursors may be reduced individually and then mixed together. Preferably, the precursors may be mixed together and then the size of the particles reduced. For example, the particles may be reduced by milling (e.g. wet milling or jet milling), grinding, chopping, crushing, attriting, or the like. The particles may be attrited for any duration of time that reduces the particles to their desired size. The average aggregate particle size may be about 5 microns or less, preferably about 4 microns or less, more preferably about 3 microns or less, even more preferably about 2 microns or less, or most preferably about 1 micron or less. The average aggregate particle size may be measured using a particle size analyzer, one preferred particle size analyzer is available from Micromeritics® Instrument Corporation.

The mixture is then shaped into a porous shape by any suitable method, such as those known in the art. Examples include injection molding, extrusion, isostatic pressing, slip casting, roll compaction and tape casting. Each of these is described in more detail in *Introduction to the Principles of Ceramic Processing*, J. Reed, Chapters 20 and 21, Wiley Interscience, 1988.

The porous green shape may be heated under an atmosphere having fluorine and a temperature sufficient to form the mullite composition. Fluorine may be provided in the gaseous atmosphere from sources such as $SiF_4$, $AlF_3$, HF, $Na_2SiF_6$, NaF, and $NH_4F$. Preferably, the source of fluorine is from $SiF_4$.

The porous green shape may be heated under an atmosphere having a fluorine containing gas that is separately provided and to a temperature sufficient to form the mullite composition. "Separately provided" means that the fluorine containing gas is supplied not from the precursors in the mixture (for example, $AlF_3$), but from an external gas source pumped into the furnace heating the mixture. This gas preferably is a gas containing $SiF_4$.

The porous body is preferably heated to a first temperature for a time sufficient to convert the precursor compounds in the porous body to fluorotopaz and then raised to a second temperature sufficient to form the mullite composition. The temperature may also be cycled between the first and second temperature to ensure complete mullite formation. The first temperature may be from about 500° C. to about 950° C. Preferably, the first temperature is at least about 550° C., more preferably at least about 650° C., and most preferably at least 725° C. to preferably at most 850° C., and most preferably at most 800° C. and most preferably at most 775° C.

The second temperature may be any temperature suitable depending on variables such as the partial pressure of $SiF_4$. Generally, the second temperature is at least 1000° C. to at most 1700° C. Preferably, the second temperature is at least 1050° C., more preferably at least 1075° C. and most preferably at least 1100° C. to preferably at most 1600° C., more preferably at most 1400° C. and most preferably at most 1200° C.

Generally, during the heating to the first temperature, the atmosphere is inert (for example, nitrogen) or a vacuum until at least 500° C., which is when a separately provided fluorine containing gas is desirably introduced. During heating to the first temperature, organic compounds and water may be removed. These may also be removed in a separate heating step common in the art described in *Introduction to the Principles of Ceramic Processing*, J. Reed, Wiley Interscience, 1988. This separate heating step is commonly referred to as binder burnout.

With regard to the method of the first aspect of the invention, the untreated mullite body may be heated to a heat treatment temperature of at least 950° C. under a heat treatment atmosphere selected from the group consisting of air, water vapor, oxygen, an inert gas and mixtures thereof, for a time sufficient to form the mullite composition. Examples of inert gases include nitrogen and the noble gases (that is, He, Ar, Ne, Kr, Xe, and Rn). Preferably, the heat treatment atmosphere is an inert gas, air, water vapor or mixture thereof. More preferably, the heat treatment atmosphere is nitrogen, air or air containing water vapor.

The time at the heat treatment temperature is a function of the heat treatment atmosphere and temperature selected. For example, a heat treatment in wet air (air saturated with water vapor at 40° C.) generally requires more than several hours to 48 hours at 1000° C. In contrast, ambient air, dry air or nitrogen (air having a relative humidity from 20 percent to 80 percent at room temperature) desirably is heated to 1400° C. for at least 2 hours.

Generally, the time at the heat treatment temperature is at least about 0.5 hour and is dependent on the temperature used (that is, generally, the higher the temperature, the shorter the time may be). The time at the heat treatment temperature may be about 1 hour or more, preferably about 2 hours or more, more preferably about 4 hours or more, even more preferably about 6 hours or more, or most preferably at least about 8 hours to preferably at most about 4 days, more preferably at most about 3 days, even more preferably at most about 2.5 days and most preferably at most about 2 days.

To ensure that any Mg and/or Fe impurities stay incorporated within the glassy phase of the acicular mullite, the heat treatment temperature is preferably at least 1000° C., more preferably at least 1050° C., even more preferably at least 1100° C., and most preferably at least 1200° C. to preferably at most 1700° C., more preferably at most 1600° C. and preferably at most 1550° C.

The mullite composition may be particularly useful as a support for a catalyst, such as precious metal catalyst on alumina particles, typically referred to as a catalyst wash coat, used in automotive catalytic converters. It is preferred that the mullite grains have an aspect ratio of at least about 10. It is also preferred that the wash coat makes a thin coating on at least a portion of the mullite grains. A portion is generally when, at least about 10 percent of the area of the grains of one region are covered by the catalyst coating. Preferably, substantially all of the grains of one region are coated. More preferably, substantially all of the grains of the composition are coated.

Thin coating means that the catalyst wash coating has a thickness generally less than the average smallest dimension of the grains coated. Generally, the thickness of the coating is at most half the thickness, preferably at most one third and most preferably at most one quarter the thickness of the average smallest dimension of the grains coated.

The composition may also be particularly useful as a particulate (soot) trap and oxidation (that is, exhaust) catalyst for mobile power applications (for example, diesel engines) and stationary power applications (for example, power plants). The mullite composition, when used as a diesel particulate trap, may have at least a portion of the mullite grains coated with a catalyst, as described above. Of course, the composition may be useful as soot trap itself without any catalyst.

Illustrative Embodiments of the Invention

The following examples are provided to illustrate the invention, but are not intended to limit the scope thereof. All parts and percentages are by weight unless otherwise indicated.

Example 1 is performed using samples that include precursor materials at a concentration of about 25.4 weight percent Hywite Alum Clay available from Imerys; about 25.4 weight percent clay that includes about 52 percent $SiO_2$, about 44 percent $AL_2O_3$, about 1.2 percent $TiO_2$, and about 0.8 percent $Fe_2O_3$ available under the tradename ARGICAL_C 88R from Imerys; about 46.4 weight percent CKA-10 alumina, and about 2 weight percent Iron Oxide and Magnesium Oxide in the form of Talc as a dopant. The precursor materials are added to a Union Process small laboratory attritor and mixed for between 0 hours to 3 hours, as is illustrated in Table 1, using a YZT 5 mm attrition media. The mixed precursor materials are dried. The dry precursor materials are combined in a Mr. Coffee grinder with about 10 weight percent A15LV Methocel and about 40 weight percent water and mixed together. The contents are removed from the grinder and extruded in a small laboratory extruder where a thin bar that is about 1 mm thick and about 8 mm wide is created. The thin bars are dried, calcined, mullitized, and heat treated as disclosed in U.S. Pat. No. 7,425,279, for example Column 8; lines 25-61, incorporated by reference herein. This process creates about 10 thin bars for each sample as is seen in Table 1. Each of the 10 thin bars are broken using the 4-point bending test of ASTM C111 and the results are available in Table 1. Once the samples are broken, three pictures are taken at random locations along the broken surface of the thin bars using 1000 magnification, which results in an area of about 100 microns$^2$ being photographed. Each of the photographs are analyzed for the total number of grains, the number of non-broken grains, the number of broken grains (i.e., grains that fractured during the bending test due to being connected to other grains), and the number of grains that are in contact with another grain. The results of this analysis are available in Table 1 under connectivity. Table 1 illustrates that as the average particle size of the precursor material is reduced the connectivity and strength of the sample increases.

Example 1 illustrates the effect of reducing the average particle size of raw materials using attrition on strength characteristics and connectivity, as shown in Table 1. As the average particle size of the raw materials is reduced below 3 microns, the mullite grain connectivity of the acicular mullite body increases to above 70 percent. This increase in connectivity results in a rapid increase in strength (e.g., a reduction from 7.5 microns to 2.8 microns of the precursor material results in a corresponding strength change from 26.5 MPa to 38.4 MPa), while maintaining porosity between 52 and 55 percent. A further reduction in particle size to 1.7 microns results in a corresponding strength of 45.9 MPa and a porosity of between 52 and 55 percent.

TABLE 1

| Sample No. | Attrition time (hours) | Avg. Particle Size (Microns) | Connectivity (%) | Strength (MPa) |
| --- | --- | --- | --- | --- |
| 1 | 0 | 7.5 | 56 | 26.5 |
| 2 | 0.5 | 2.8 | 72 | 38.4 |
| 3 | 1.0 | 2.2 | 75 | 39.3 |
| 4 | 2.0 | 1.8 | 92 | 44.1 |
| 5 | 3.0 | 1.7 | 94 | 45.9 |

Example 2 illustrates the effect of dopant concentration on the mullite microstructure as well as, strength, thermal shock resistance, and connectivity. The precursor material is crystalline silica and kappa alumina CKA-10 available from CTI which are used at a ratio of Al/SI of about 3.4. The precursor materials are mixed with water and attrited for 3 hours using a 5 mm YTZ attrition media so that the average particle size is about 1.7 microns. The dopant is mixed at a ratio of 1:1 MgO/Fe2O3 for the four samples that include a dopant. The samples are extruded, calcined, mulitized, and heat treated in accordance with the methods of Example 1. The samples are broken and photographed in accordance with Example 1, the results of which are included in Table 2. The results of table 2 indicate that as the amount of dopant increases the connectivity and strength of the acicular mullite body increases without greatly affecting the number of grains present in a 100 microns$^2$ cross section.

Example 2 demonstrates the effect of reducing the amount of dopant in the Acicular Mullite formulation from 2 percent to 1 percent if the average aggregate particle size of the raw materials is reduced to below 3 microns by attritting, as is evident in samples 1-5. Sample 6 in Table 2 is made using the same formulation as samples 1-5 and is processed in the same way as samples 1-5, except that sample 6 is not attritted.

Example 2 illustrates that both connectivity and strength increase with an increase in dopant. Example 2 further illustrates that dopant use is reduced by using a reduced particle size, while maintaining strength characteristics. This is evident by comparing sample 2 and sample 6 where the two samples have similar strength characteristics, but attritted sample 2 requires 0.5 percent dopant; whereas, sample 6 requires 2 percent dopant.

TABLE 2

| Sample | Weight % of MG/FE Dopant | Connectivity (%) | Number of grains per 100 microns$^2$ | Strength (MPa) | Porosity (%) |
|---|---|---|---|---|---|
| 1 | 0 | 10 | 450 | 13 | 53-55 |
| 2 | 0.5 | 74 | 69 | 23 | 53-55 |
| 3 | 1.0 | 90 | 65 | 30 | 53-55 |
| 4 | 1.5 | 98 | 62 | 31 | 53-55 |
| 5 | 2.0 | 99 | 63 | 36 | 53-55 |
| 6 | 2.0 | 73 | 75 | 25 | 53-55 |

Example 3 is a comparative example of an attrited sample to a non-attrited sample. Example 3 illustrates the effects of attrition on average grain size and strength. Sample 1 (non-attrited) and Sample 2 (attrited) are both prepared using the same method as discussed above for Example 1. The compositions of the precursor materials for both Sample 1 and Sample 2 are: 25.35% of clay 1 (from Hywite Alum, part of IMERYS, GA); 25.35% clay 2 (from AGS Minerals part of IMERYS in GA); 46.39% kappa alumina (CTIKA01-DL206/2 from Ceramiques Technigues et Industrielles at Salindres, France); 0.3% Fe2O3 from Atlantic Equipment Engineers at Bergenfield, N.Y.; and 2.6% Talc from Whittaker, Clarks and Daniels, Inc. Sample 1 and Sample 2 have a beginning average particle size of about 7.5 µm. Sample 1 is not attrited. Sample 2 is attrited for 3 hours until the average particle size is about 1.7 µm. A blend of this composition is mixed with 40 percent water and 10 percent A15LV Methocel from Dow Chemical Company, by weight respectively, and extruded in a small laboratory extruder where a thin bar that is about 1 mm thick and about 8 mm wide is created. The thin bars are dried, calcined, mullitized, and heat treated as discussed above in Example 1. This process creates about 10 thin bars for each sample. Each of the 10 thin bars are broken using the 4-point bending test of ASTM C111 and the results are available in Table 3. The results in table 3 illustrate that the average pore size remains relatively constant; however, the distribution of the pore size is reduced. The average grain size is reduced and the standard deviation of the pore size is reduced by about 19 percent. The spread between the ten percentile and the ninety percentile is reduced from 8.4 microns to 6.9 microns leading to a more uniform grain structure in the mullite body as a result of having more uniform sized grains. The spread between the first quartile and the third quartile similarly exhibits a reduced variation between the grain size in the respective quartiles. The non-attrited sample broke at 28.5 MPa and the attrited sample broke at 38.5 MPa resulting in about a 26 percent increase in strength at a porosity between 52 to 55 percent.

Example 3 illustrates that attrition of the raw material leads to a reduction in the average aggregate particle size and corresponds to tighter distribution of grain widths after mullitization. The two samples, before mullitization, have pore sizes that are similar in size; however, the attrited sample demonstrates a reduction in average pore size distribution due to a narrower grain size distribution. The reduction in both pore size distribution and grain size distribution result in a more uniform microstructure, higher connectivity, and ultimately higher strength while maintaining a similar level of porosity.

TABLE 3

| Test | Sample 1 (Not Attrited) | Sample 2 (Attrited) |
|---|---|---|
| Average Pore Size Before Mullitization (microns) | <1 | <1 |
| Average Pore Size in Mullitized Sample (microns) | 10.4 | 9.7 |
| Pore Size Distribution at D50 (microns) | 6 to 15 | 6 to 12 |
| Average grain diameter (microns) | 7.4 with a standard deviation of 3.2 | 5.5 with a standard deviation of 2.6 |
| Spread of grain diameter @ 10% and 90% (microns) | 2.9 and 11.3 = 8.4 | 2.1 and 9.2 = 6.9 |
| Spread of grain diameter between first and third quartile (microns) | 5.3 and 9.7 microns = 4.4 microns | 3.5 and 6.9 = 3.4 |
| Strength (MPa) | 28.5 | 38.5 |

FIGS. 1-6 are examples of acicular mullite bodies and greenware produced in the examples above that have been cut, polished, and magnified. FIG. 1 illustrates a piece of greenware using precursors with standard sized particles 2. The particle distribution appears uneven and there are many larger particles that can be seen in the sample. Pores 4 between the particles can also be seen (i.e., spaces where no particles are present in the greenware).

Figure 2:
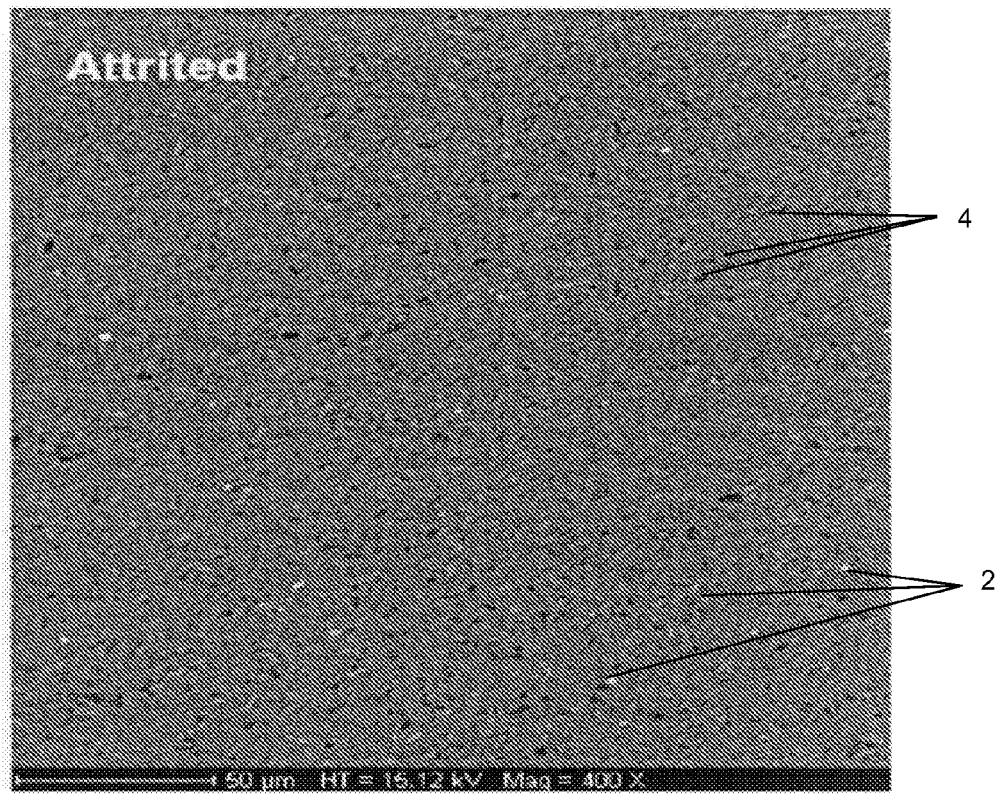
FIG. 2 illustrates one example of a calcined greenware body where the precursors are attrited.

FIG. 2 illustrates a piece of green ware created using precursors with a standard particle size of 3 microns or less. The particle 2 distribution of the microstructure is more even and uniform throughout the cross section. The pores 4 between particles are much smaller; however, more pores are present in the greenware. The particles in the sample of FIG. 2 are much less noticeable in comparison to FIG. 1 (i.e., it is difficult to see individual particles).

Figure 3:
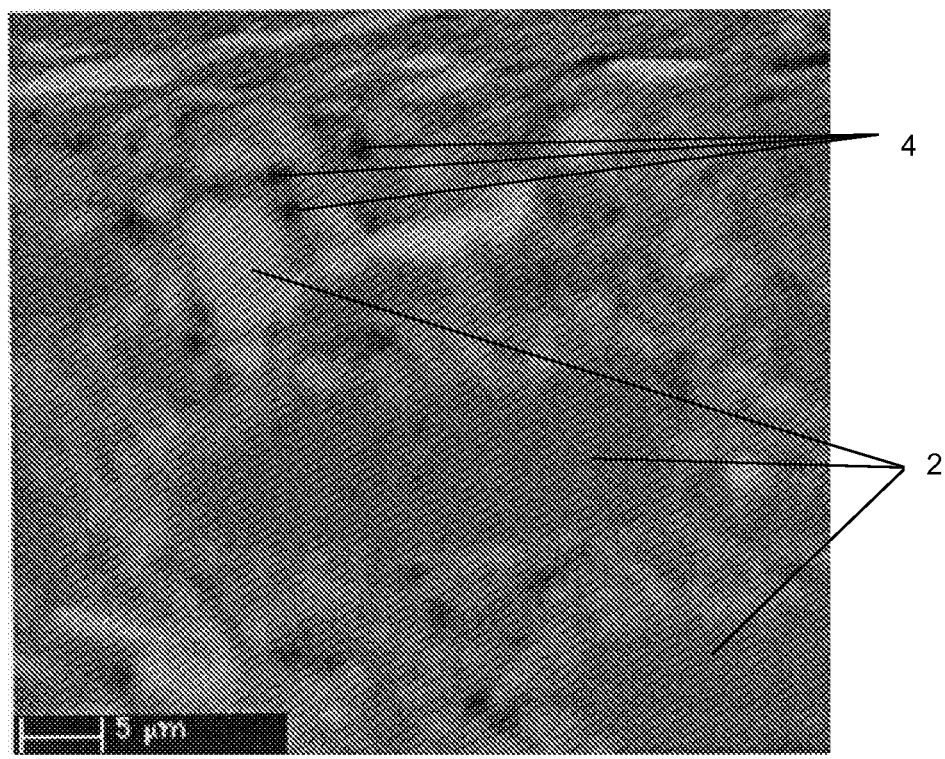
FIG. 3 illustrates another example of calcined greenware using standard precursors.
Figure 4:
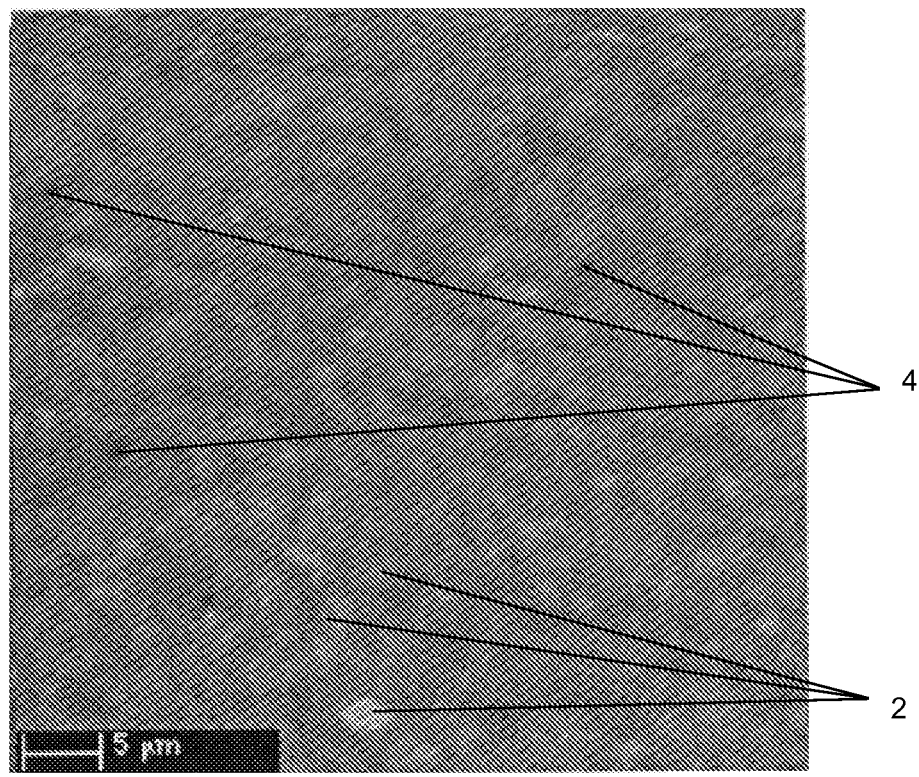
FIG. 4 illustrates another example of calcined greenware where the precursors are attrited.

FIG. 3 illustrates a magnified view of FIG. 1, and the particles 2 and the pores 4 are more apparent within the greenware. FIG. 4 illustrates a magnified view of FIG. 2 and individual particles 2 are not readily apparent, and the greenware does not contain large pores 4 between particles.

Figure 5:
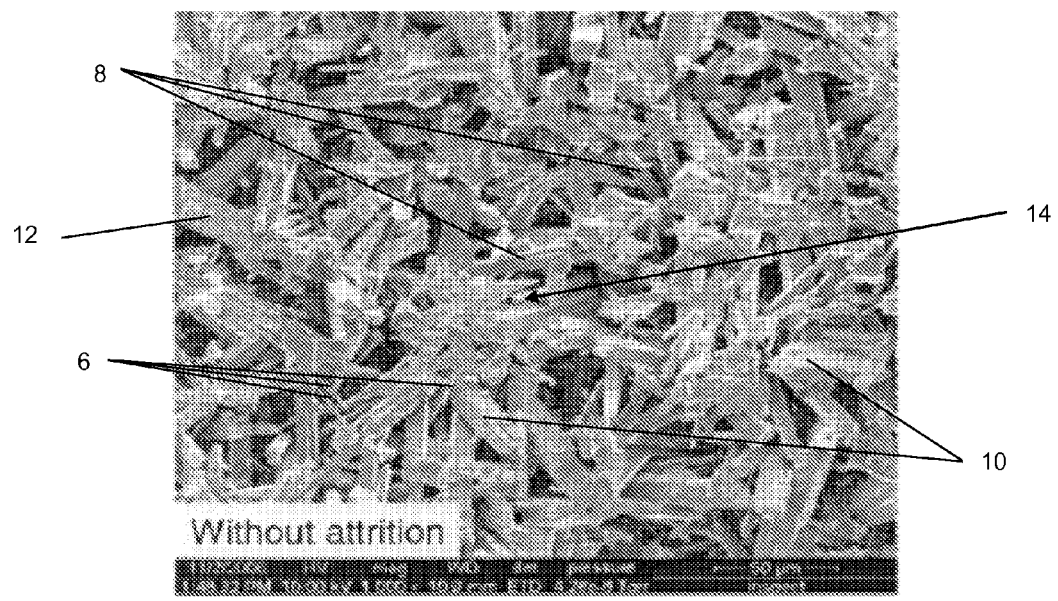
FIG. 5 illustrates one example of an acicular mullite body using standard precursors.

FIG. 5 illustrates a cross section of a final acicular mullite body where the microstructure of the acicular mullite body is visible. The acicular mullite body of FIG. 5 includes small grains 6, medium grains 8, large grains 10, ultra large grains 12, and starbursts 14. The microstructure of the acicular mullite body includes a variety of different grain sizes and structures.

Figure 6:
FIG. 6 illustrates one example of an acicular mullite body where the precursors are attrited.

FIG. 6 illustrates another cross section of a final acicular mullite body where the precursor materials were the average aggregate particle size was attrited to a size of 3 microns or less. As can be seen in FIG. 6 the grains are much more uniform in size. The acicular mullite body does not include ultra large particles or small particles. The acicular mullite body includes medium grains 8 and large grains 10. The grain distribution is more uniform and evenly distributed due to the more uniform grain size; thus, resulting in an acicular mullite body that exhibits improved strength characteristics. Broken grains 16 are also present in FIG. 6.

Figure 7:
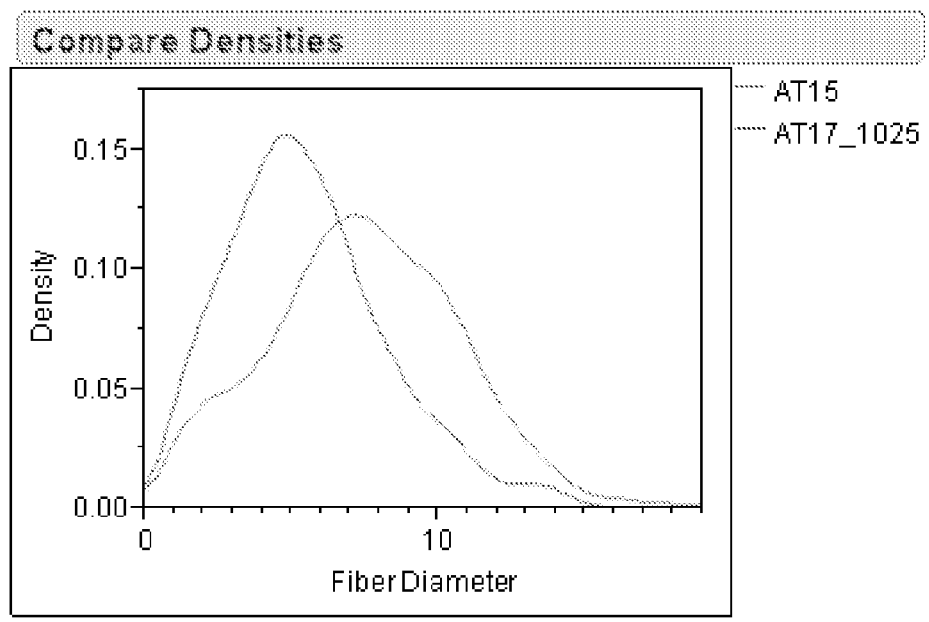
FIG. 7 illustrates a graphic example comparing an attrited sample to a non-attrited sample.
Figure 8:
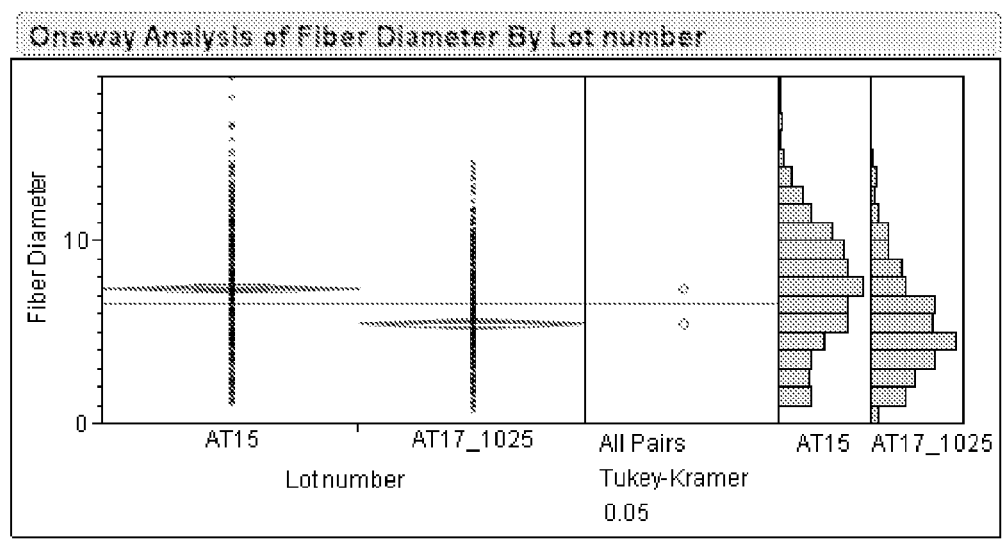
FIG. 8 illustrates a different graphic example comparing the fiber diameter distribution of an attrited sample to a non-attrited sample.

FIGS. 7 and 8 illustrate examples of grain diameter distributions (i.e. fiber diameter). FIG. 7 shows that the attrited sample (i.e. AT17) has a more uniform (i.e. narrower) diameter distribution. The non-attrited sample (i.e. AT15) includes a broader distribution in particle size when compared to the attrited sample, and less of the grains are located in the 1 µm to 10 µm range. For example, the density (i.e., frequency) of grains is higher between 1 µm to 10 µm for the attritted sample than the non-attrited sample. FIG. 8 again shows that the attrited sample includes a narrower grain diameter distribution. For example, the attrited sample does not include any outliers; whereas, the non-attrited sample includes multiple outliers. The attrited sample has a smaller average grain diameter size as compared to the non-attrited sample. The uniformity in the structure of the acicular mullite body results in increased strength of the mullite body.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. Plural elements, ingredients, components or steps can be provided by a single integrated element, ingredient, component or step. Alternatively, a single integrated element, ingredient, component or step might be divided into separate plural elements, ingredients, components or steps.

Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A mullite body comprising:
a plurality of crystals, wherein about 70 percent or greater of the crystals have a crystal diameter that is within about 3 microns or less of an average diameter of the plurality of crystals; and a porosity of 55 percent or greater and at least 80 percent of the crystals have a diameter between about 2 microns and about 20 microns.

2. The mullite body of claim 1, wherein about 90 percent or greater of the crystals are within about 3 microns or less of the average diameter of the plurality of crystals.

3. The mullite body of claim 1, wherein about 95 percent or greater of the crystals are within about 2.7 microns or less of the average diameter of the plurality of crystals.

4. The mullite body of claim 1, wherein at least 95 percent of the crystals have a diameter between about 2 and about 20 microns.

5. The mullite body of claim 1, wherein the mullite body is made from a precursor material that has an average aggregate particle size of about 3 microns or smaller.

6. The mullite body of claim 1, wherein the mullite body has an average pore size between about 5 microns and about 30 microns.

7. The mullite body of claim 1, wherein a crystal to crystal connectivity is 75 percent or greater relative to the total number of acicular mullite crystals present in the mullite body.

8. The mullite body of claim 1, wherein a crystal to crystal connectivity is between about 75 percent and 99 percent of the individual grains are connected relative to the total number of acicular mullite crystals present in the mullite body.

9. The mullite body of claim 1, wherein the mullite body is made from a precursor material that has an average aggregate particle size of about 2 microns or smaller.

10. The mullite body of claim 1, wherein the final strength of the mullite body is about 35 MPa or greater when tested using ASTM C1161.

11. The mullite body of claim 1, wherein the mullite body is substantially free of mullite grains with a diameter of about 5 microns or smaller.

12. The mullite body of claim 1, wherein about 70 percent or more of the grains are broken during a four point bending test using ASTM C1161.

13. A process of forming a mullite body comprising:
a. mixing precursor materials together with an average aggregate particle size of about 3 microns or smaller measured using a particle size analyzer;
b. heating greenware in air to a first temperature such that the greenware is dried and forms calcineware;
c. heating the calcineware in a silicon tetraflouride atmosphere to form flurotopaz; and
d. heating to a second temperature forming the mullite body, wherein said mullite body is comprised of a plurality of crystals, wherein about 70 percent or greater of the crystals have a crystal diameter that is within about 3 microns or less of an average diameter of the plurality of crystals; and a porosity of 55 percent or greater.

14. The process of claim 13, wherein the process includes the step of reducing the size of the precursor material so that that the average aggregate particle size is about 3 microns or smaller.

15. The process of claim 13, wherein the process includes the step of treating the final structure with heat so that precipitates are incorporated into a glassy phase of the mullite structure.

16. The process of claim 13, wherein the average aggregate size of the powders used in the greenware is about 1 micron or smaller.

17. The process of claim 13, wherein the process includes the step of drying the mixture before shaping the greenware, and wherein the precursor materials are clay, alumina oxide, and a dopant.

18. The process of claim 13, wherein the mullite body has a strength of between about 36 MPa and about 46 MPa when tested using ASTM C1161.

* * * * *